(12) United States Patent
Lee et al.

(10) Patent No.: US 7,369,872 B2
(45) Date of Patent: May 6, 2008

(54) MOBILE COMMUNICATION DEVICE FOR SEARCHING DATA BASED ON ROTATION DEGREE AND A METHOD THEREOF

(75) Inventors: Woo-jong Lee, Suwon-si (KR); Sang-on Choi, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 50 days.

(21) Appl. No.: 11/074,675

(22) Filed: Mar. 9, 2005

(65) Prior Publication Data

US 2005/0243783 A1    Nov. 3, 2005

(30) Foreign Application Priority Data

Mar. 31, 2004  (KR) ...................... 10-2004-0022145

(51) Int. Cl.
*H04M 1/00* (2006.01)

(52) U.S. Cl. .............. 455/550.1; 455/414.1; 455/414.2; 455/456.1; 455/457; 455/564; 455/566; 340/547; 340/995.1; 340/995.14; 340/995.17; 340/995.19; 702/150; 702/151; 701/211

(58) Field of Classification Search ............ 455/404.2, 455/422.1, 414.1, 423, 550.1, 456.1, 456.2, 455/456.3, 456.4, 456.5, 456.6, 457, 556.1, 455/557, 414.2, 564, 566; 340/988, 539.1, 340/539.26, 547, 549, 545.3, 995.17, 995.19, 340/995.1, 995.11, 995.14, 995.15; 701/211, 701/208, 209, 212; 702/150, 151
See application file for complete search history.

(56) References Cited

U.S. PATENT DOCUMENTS

| | | | | |
|---|---|---|---|---|
| 6,449,496 | B1 * | 9/2002 | Beith et al. ................. | 455/563 |
| 6,690,954 | B2 * | 2/2004 | Ushida ........................ | 455/563 |
| 6,957,088 | B2 * | 10/2005 | Kato et al. .................. | 455/566 |
| 6,983,124 | B1 * | 1/2006 | Bayley et al. .............. | 455/41.2 |
| 2001/0029430 | A1 * | 10/2001 | Tamura ....................... | 701/213 |
| 2003/0164778 | A1 * | 9/2003 | Muramatsu ................. | 340/988 |
| 2003/0224830 | A1 * | 12/2003 | Zhang et al. ............... | 455/566 |
| 2004/0171394 | A1 * | 9/2004 | Daita .......................... | 455/466 |

FOREIGN PATENT DOCUMENTS

| | | |
|---|---|---|
| EP | 0825514 A2 | 8/1997 |
| EP | 1385082 A1 | 1/2004 |
| JP | 9-36945 A | 2/1997 |
| JP | 2003-90725 A | 3/2003 |
| JP | 2003-111142 A | 4/2003 |
| JP | 2003-179685 A | 6/2003 |
| KR | 2001-0110487 A | 12/2001 |
| KR | 2003-0047095 A | 6/2003 |
| WO | WO 03/062975 A1 | 7/2003 |

* cited by examiner

*Primary Examiner*—Charles N. Appiah
*Assistant Examiner*—Olumide Ajibade-Akonai
(74) *Attorney, Agent, or Firm*—Sughrue Mion, PLLC

(57) ABSTRACT

Disclosed is a mobile communication device for searching data based on a rotation angle. The mobile communication device includes a body; a geomagnetic sensor for detecting a rotation angle of the body based on an axis perpendicular to the earth surface; a main memory for storing an image corresponding to the rotation angle; a display unit for displaying the image on a screen; and a control unit for, if the rotation angle detected in the geomagnetic sensor is changed, extracting an image corresponding to the changed rotation angle from the main memory and controlling the display unit to display the image. With this technology, data can be searched conveniently without manipulating keys many times.

13 Claims, 8 Drawing Sheets

MOBILE COMMUNICATION DEVICE FOR SEARCHING DATA BASED ON ROTATION DEGREE AND A METHOD THEREOF

CROSS-REFERENCE TO RELATED APPLICATIONS

This application claims priority from Korean Patent Application No. 2004-22145 filed on Mar. 31, 2004, in the Korean Intellectual Property Office, the disclosure of which is incorporated herein by reference.

BACKGROUND OF THE INVENTION

1. Field of the Invention

The present invention relates to a mobile communication device and a communication method thereof. More particularly, the present invention relates to a mobile communication device that recognizes its rotation degree by using a geomagnetic sensor and searches data based on the rotation degree, and a communication method thereof.

2. Description of the Related Art

As communication technology develops, diverse wireless mobile communication devices such as mobile phones, laptop computers, personal digital assistants (PDA) and the like are developed and used widely. Among them, mobile phones are the most widely spread and they are being equipped with even more diverse functions than the initial models, such as a function of photographing, a function of video recording, and a function of mobile Internet. Also, as the volume of data to be stored gets larger, the memory capacity becomes larger as well and various technologies for searching data are developed.

The most representative method for searching data is using key buttons. According to the method, a user can search stored data by using number keys and direction keys provided to a mobile communication device. The data search can be carried out more conveniently by using data grouping and shortcut keys. Meanwhile, a method of searching desired data by using speech recognition technology is currently being used. In particular, a mobile phone with this speech recognition technology can search a telephone number stored therein and dial the telephone number. This is already commercialized and used widely several years ago. Also, PDAs with a touch screen technology are in use.

FIG. 1 is an illustration showing buttons 12 used for searching data stored in a mobile phone 10. If a user selects a 'telephone book' menu by manipulating the buttons 12 such as the number keys and the direction keys, diverse submenus comprising 'search by name,' 'search by number,' 'search by shortcut number,' and 'search by group' are presented on a screen 11, as shown in FIG. 1. If the user selects the 'search by group' submenu, a list of diverse groups such as family, friends, company, and relatives, which are stored by the user in advance is displayed, and the user can search telephone numbers of each group.

If the user searches a telephone number by using the buttons, each menu and submenus are arranged in a tree structure. Thus, it takes a long time to search a desired telephone number, because the user makes many selections every time the user searches a telephone number. Moreover, foreigners who do not read Korean or those who are not familiar with key manipulation, such as senior citizens and children, cannot search the data easily.

Meanwhile, also in common use is a technology that stores frequently-used telephone numbers in shortcut numbers and then, if the user inputs a shortcut number, a call is made directly at a telephone number corresponding to the shortcut number. However, this technology also has a shortcoming that the user should always memorize the shortcut numbers.

FIG. 2 is an illustration describing a case where a telephone number is searched based on a speech recognition technology. The speech recognition technology is a technology that, if a user pronounces a particular name corresponding to the telephone number, a mobile phone 10 recognizes the speech and makes a call at a telephone number corresponding to the speech.

However, it is hard to search the desired data correctly due to the noise of surroundings during a speech recognition process and a problem in the pronunciation of the user. Also, if the user pronounces a particular name, all telephone numbers of a similar name are extracted and presented to the user for selection. This is troublesome and takes a long time.

SUMMARY OF THE INVENTION

An aspect of the present invention is to solve at least the above problems and/or disadvantages and to provide at least the advantages described below. Accordingly, an aspect of the present invention is to provide a mobile communication device that can search stored data by recognizing its rotation degree, and a method thereof.

In order to achieve the above-described aspects of the present invention, there is provided a mobile communication device which comprises a body, a geomagnetic sensor for detecting a rotation angle of the body based on an axis perpendicular to the earth surface, a main memory for storing an image corresponding to the rotation angle, a display unit for displaying the image on a screen, and a control unit for, if the rotation angle detected in the geomagnetic sensor is changed, extracting an image corresponding to the changed rotation angle from the main memory and controlling the display unit to display the image.

In this case, the main memory can record a telephone number corresponding to the rotation degree additionally.

The mobile communication device can further include a key input unit for receiving an external signal, and a communication module for, if the body is rotated at a predetermined angle and a call connection request signal is inputted through the key input unit, dialing a telephone number corresponding to the rotation angle.

In an exemplary embodiment of the present invention, if the rotation angle is maintained for a predetermined time, the mobile communication device dials a telephone number corresponding to the rotation degree detected in the geomagnetic sensor.

If a rotation recognition mode is selected through the key input unit, the control unit controls the display unit to display all image data stored in the main memory on the edge of the screen in the direction of a rotation angle corresponding to each image.

The image corresponding to a rotation angle detected in the geomagnetic sensor is displayed in the center of the screen among all the images stored in the main memory.

The geomagnetic sensor which is used in an exemplary embodiment of the present invention comprises a geomagnetism detecting module having an X-axis fluxgate and a Y-axis fluxgate for detecting electric signals corresponding to geomagnetism from the X and Y-axis fluxgates, individually, the X and Y-axis fluxgates being orthogonal to each other, a signal processing unit for converting the electric signals detected from the X and Y-axis fluxgates into output values of X and Y axes and outputting the X and Y-axis output values, and a geomagnetism computing unit for normalizing the X and Y-axis output values into values in a predetermined range and computing the rotation angle based on the normalized X and Y-axis output values.

In accordance with another aspect of the present invention, there is provided a method for searching data in a mobile communication device, which comprises the steps of a) detecting a rotation angle of the mobile communication device based on an axis perpendicular to the earth surface, b) extracting an image corresponding to the rotation angle, c) displaying the image on a screen, and d) if the rotation angle is changed, extracting an image corresponding to the changed rotation angle and displaying the image on the screen.

The data searching method further comprises the steps of e) receiving a call connection request signal while a predetermined image is displayed on the screen, and f) dialing a telephone number corresponding to the image.

The data searching method further comprises a step of dialing a telephone number corresponding to the image automatically, if the image is displayed on the screen for a predetermined time.

In the step c), all image data stored in the mobile communication device are displayed on the edge of the screen in a direction corresponding to the rotation angle corresponding to each image, and an image corresponding to the rotation angle of the mobile communication device is displayed in the center of the screen.

In the step a), the rotation angle is detected by using a biaxial fluxgate sensor. Herein, the step a) comprises the steps of a1) detecting electric signals corresponding to geomagnetism from the biaxial fluxgate sensor, a2) converting the electric signals detected from the biaxial fluxgate sensor into output values of X and Y axes and outputting the X and Y-axis output values, a 3) normalizing the X and Y-axis output values into values of a predetermined range, and a4) computing the rotation angle based on the normalized X and Y-axis output values.

Accordingly, the degree of rotation is recognized and the stored data are searched based on the recognized degree of rotation.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF THE EXEMPLARY EMBODIMENTS

Figure 1:
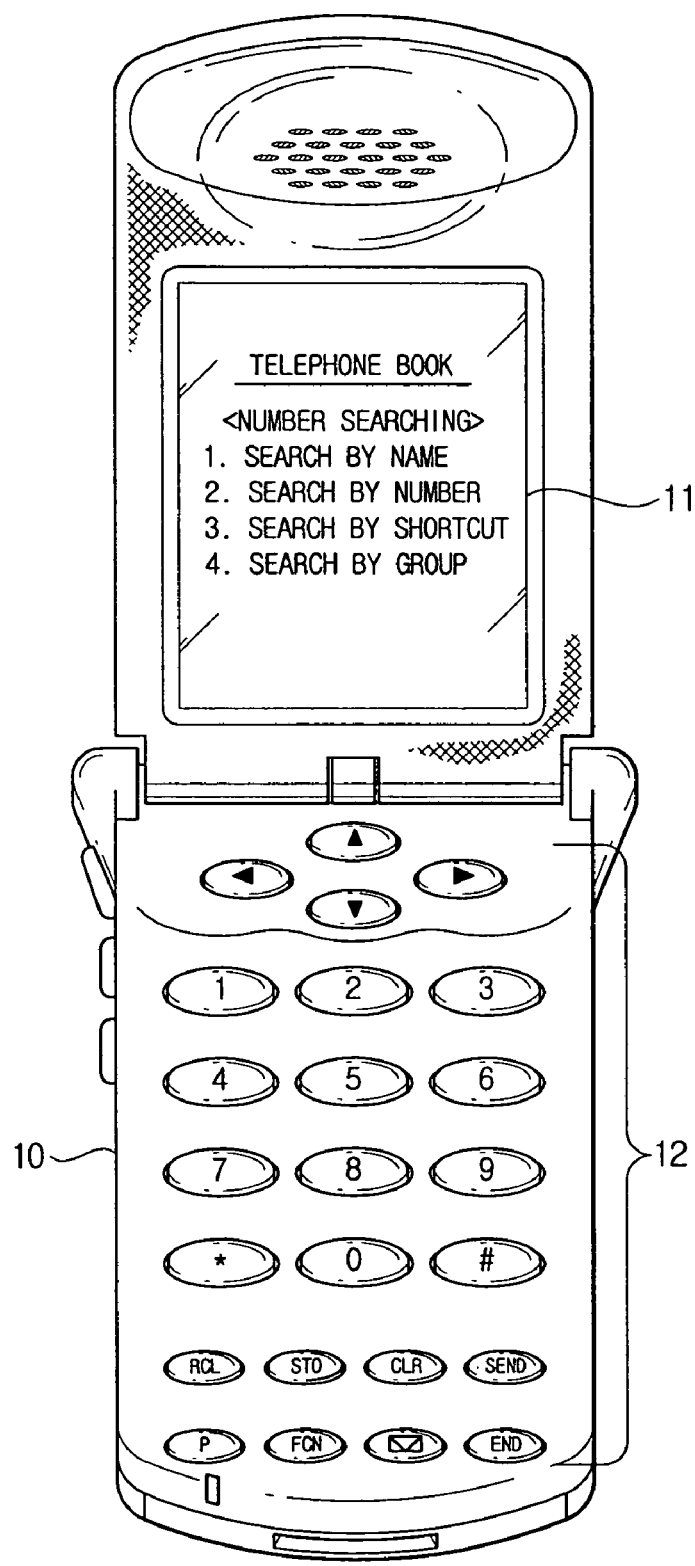
FIG. 1 is an illustration showing a method of searching a telephone number in a conventional mobile phone.
Figure 2:
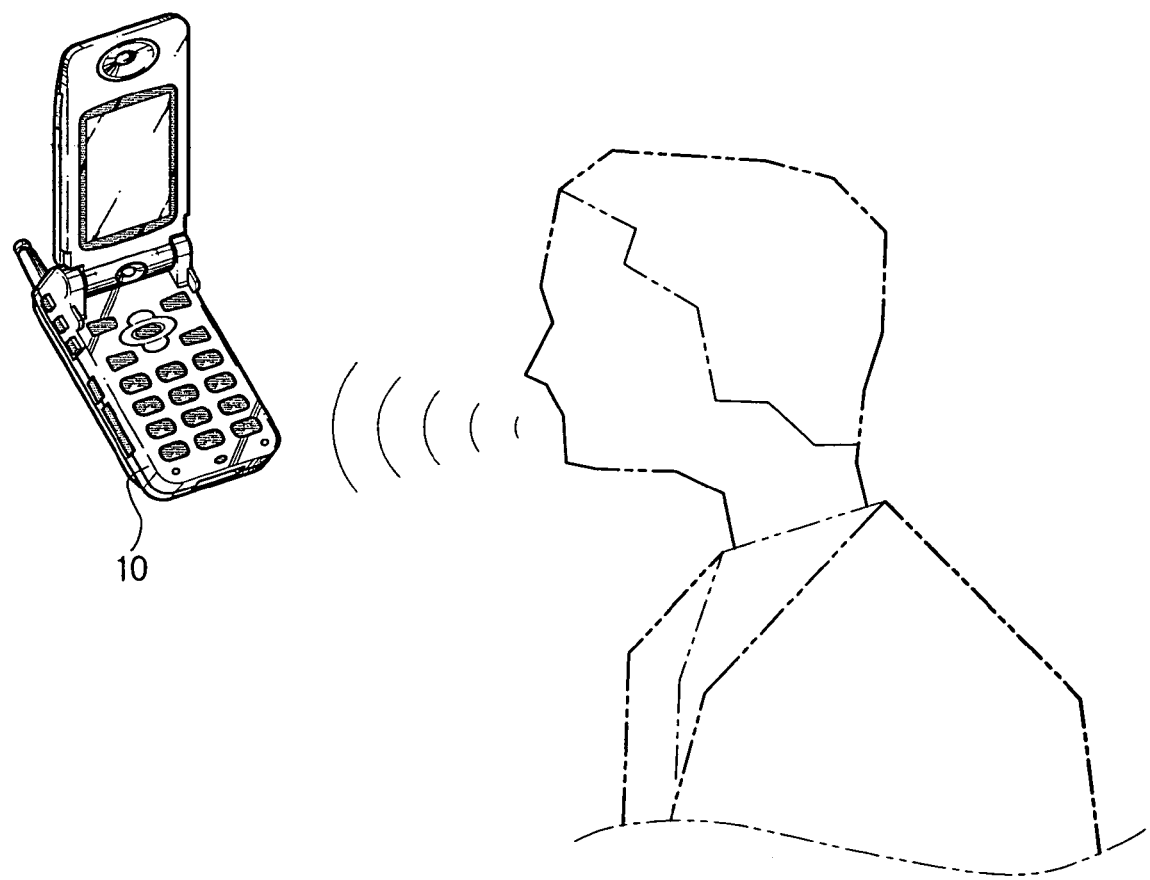
FIG. 2 is an illustration describing a method for searching a telephone number based on speech recognition technology in a conventional mobile phone.

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
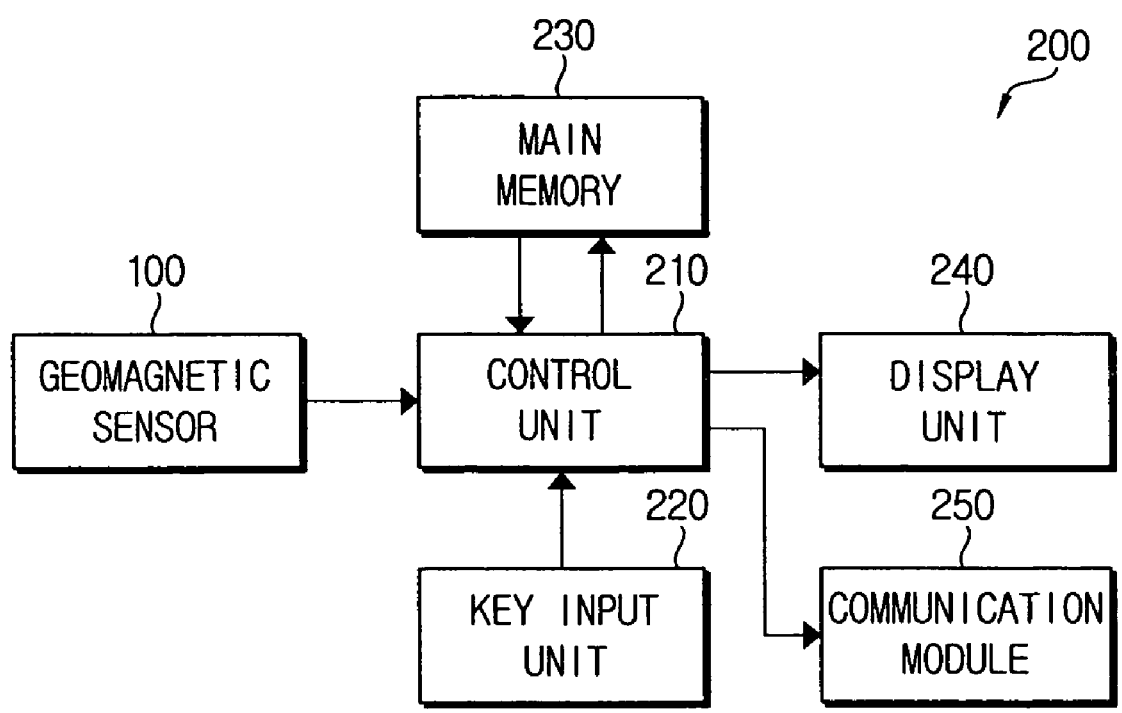
FIG. 3 is a block diagram illustrating a mobile communication device in accordance with an exemplary embodiment of the present invention.

FIG. 3 is a block diagram illustrating a mobile communication device 200 in accordance with an embodiment of the present invention. According to FIG. 3, the mobile communication device 200 comprises a geomagnetic sensor 100, a control unit 210, a key input unit 220, a main memory 230, a display unit 240, and a communication module 250.

The key input unit 220 is equipped with number keys and direction keys and it transmits an input signal inputted by the button manipulation of the user to the control unit 210.

The geomagnetic sensor 100 measures the intensity and direction of geo magnetism, which cannot be sensed by human beings, and outputs them in the form of predetermined values. The geomagnetic sensor 100 built in the mobile communication device 200 measures the rotation degree of the body of the mobile communication device 200 by detecting geomagnetism of the surroundings. That is, the body of the mobile communication device 200 measures its rotation angle based on an axis perpendicular to the earth surface and transmits it to the control unit 210. The rotation angle can be measured in a clockwise direction from the north set at 0°.

The control unit 210 receives the rotation degree transmitted from the geomagnetic sensor 100, that is, the rotation angle, and extracts data corresponding to the rotation angle from the main memory 230. In the main memory 230, a predetermined range of rotation angles and data corresponding to the rotation angles are stored in advance. Herein, the data stored in the main memory 230 includes not only the telephone numbers but also object images for the telephone numbers. Meanwhile, it is possible to establish error tolerance in consideration of the sensitivity of the geomagnetic sensor 100. For example, if error tolerance is established at ±5° and the geomagnetic sensor 100 detects a rotation angle in the range of −5° to +5°, the control unit 210 recognizes that it indicates a rotation degree of 0°. If the geomagnetic sensor 100 detects a rotation angle in the range of 6° to 15°, the control unit 210 recognizes that it indicates a rotation degree of 10°. The error tolerance can be established by a manufacturer or a user arbitrarily.

The control unit 210 displays data extracted from the main memory 230 on a screen through the display unit 240. That is, if an object image of a telephone number is extracted, the image is displayed on the screen. Recently, mobile phones are equipped with a built-in camera, an image obtained by photographing an object directly can be used as an object image. Also, the object images can be defined and provided by mobile communication device manufactures in advance.

Further, if the user inputs a call button through the key input unit 220, the control unit 210 controls the communication module 250 to dial a corresponding telephone number stored in the main memory 230. Herein, although the user does not input the call connection request button separately, the mobile communication device can be operated to dial the telephone number automatically if the rotation degree is maintained for a predetermined time.

Figure 4:
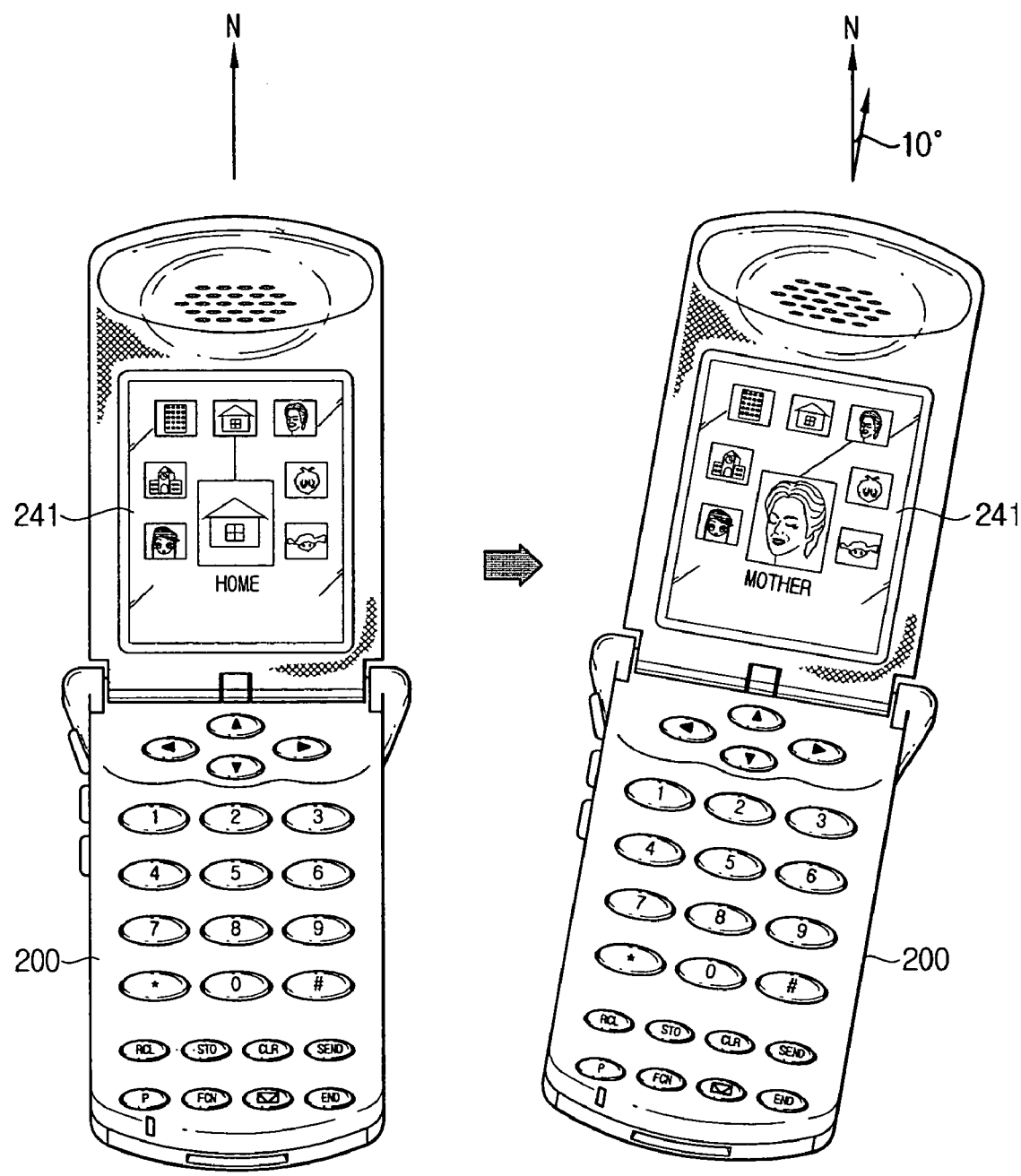
FIG. 4 is an illustration showing screen displays of a mobile communication device in accordance with an exemplary embodiment of the present invention.
Figure 5:
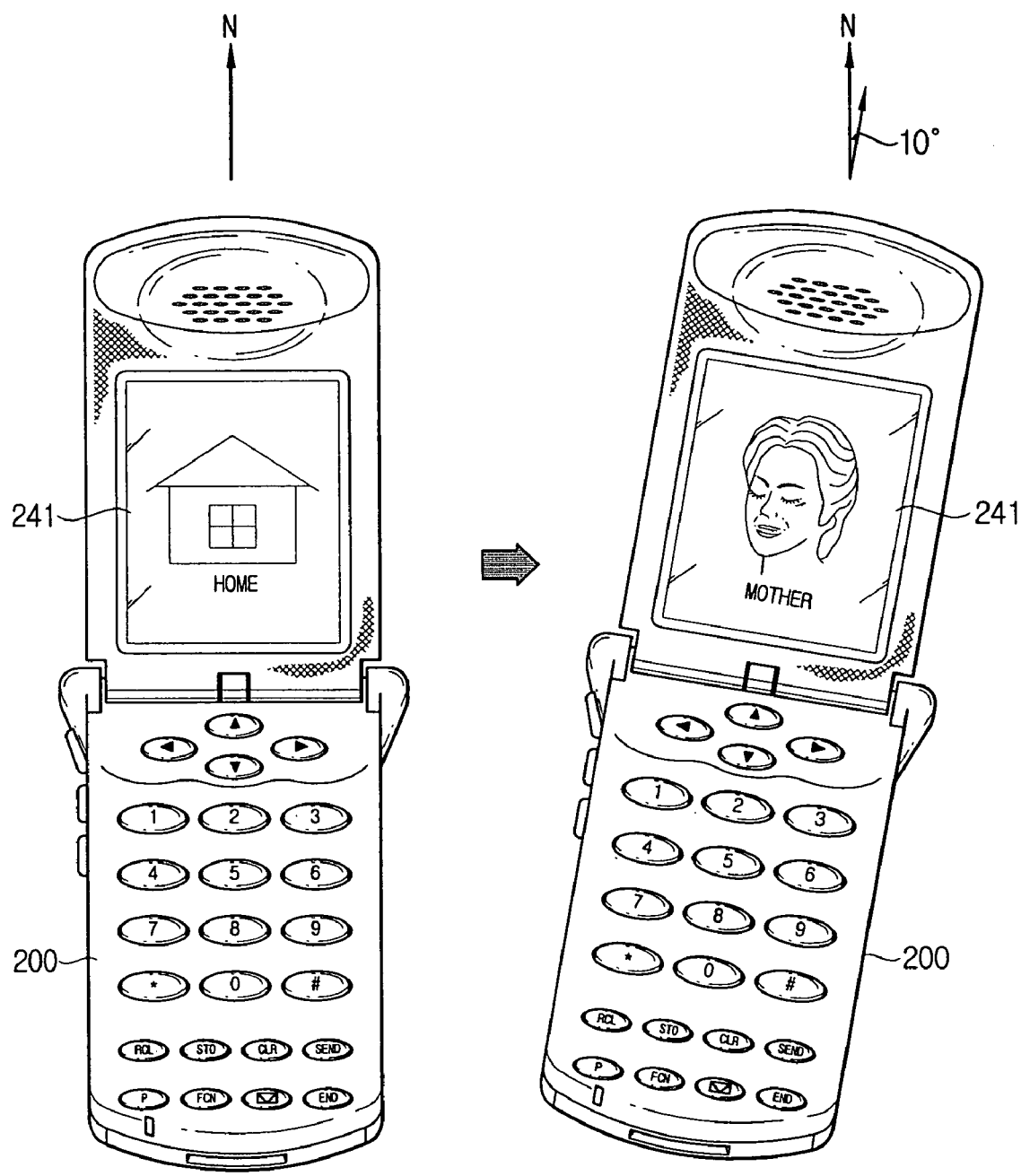
FIG. 5 is an illustration presenting other screen displays of a mobile communication device in accordance with an exemplary embodiment of the present invention.

FIGS. 4 and 5 are illustrations showing screen displays of the mobile phone 200 when the telephone number is searched based on the rotation recognition method.

If the user selects a 'rotation recognition mode' menu by manipulating the key input unit 220, the control unit 210 displays all image data stored in the main memory 230 on the screen 241, which is shown in FIG. 4. Herein, the north is set at 0° and the image data are arranged at a predetermined interval in consideration of the sensitivity of the geomagnetic sensor 100. In FIG. 4, the image data are presented at an interval of 0°, 10°, 20°, . . . , 340°, 350° based on the right north set at 0° with an error tolerance of approximately ±5°. That is, an image of 'home' is placed in a location of 0° and an image of 'mother' is placed in a location of 10°, and an image of 'office' is placed in the location of 350°. Since all the stored data are displayed on one screen, the user can know how much the mobile phone 200 should be rotated to select the desired object. If the user rotates the mobile phone 200, the image selected at the rotation degree is shown in the center of the screen 241 and its title and/or telephone number is shown in the lower part of the image.

Further, FIG. 5 displays only an image corresponding to the current rotation degree on the screen 241. Since the mobile phone 200 is relatively smaller than a laptop computer or a personal digital assistant (PDA), it is difficult to display all the images stored in the mobile phone on one screen. Therefore, only an image corresponding to the current rotation degree can be displayed. According to FIG. 5, since the mobile phone 200 in the horizontal level is directed to the north, it has a rotation degree of 0° and an image of 'home' corresponding to the rotation degree of 0° is displayed on the screen 241. Herein, a title of the image or a telephone number can be shown under the lower part of the 'home' image. Then, if the mobile phone is rotated to the right at around 10°, another image 'mother' corresponding to the rotation degree of 10° is displayed on the screen 241. The user can continue to rotate the mobile phone 200 until a desired object he wants to call is selected and, if the desired object is displayed, the user can make a call by manipulating the key input unit 220 while the desired object is still displayed.

In accordance with another embodiment of the present invention, the rotation degree can also be measured by using a tilt sensor, which is a sensor for measuring a tilt, an accelerometer, a gyro sensor, other than the geomagnetic sensor 100.

Figure 6:
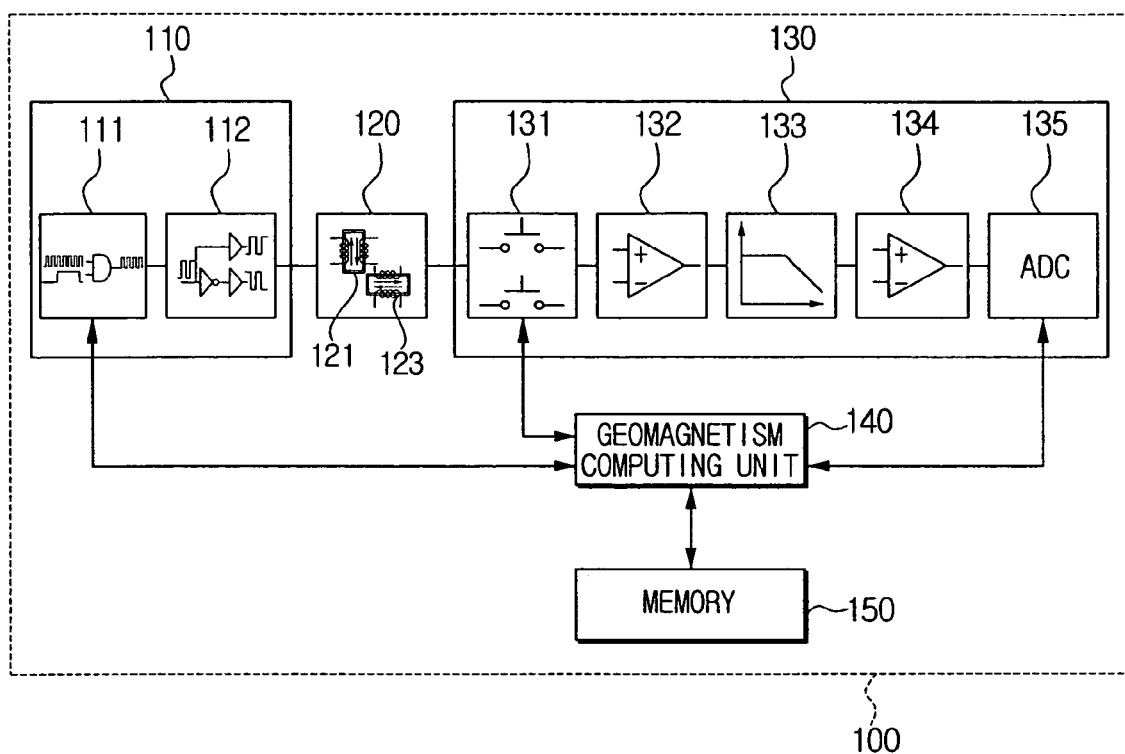
FIG. 6 is a block diagram describing a fluxgate sensor which is used as a geomagnetic sensor in the mobile communication device of FIG. 3.

FIG. 6 is a block diagram describing a fluxgate-type geomagnetic sensor which measures the rotation degree by using a biaxial fluxgate in the mobile communication device 200 of FIG. 3. The fluxgate-type geomagnetic sensor uses a high-permeability material such as permalloy as its magnetic core, and it measures the intensity and direction of an external magnetic field by measuring secondary harmonics which is in proportion to the external magnetic field generated based on the magnetic saturation of the magnetic core and non-linear magnetic characteristics by supplying an excited magnetic field through an operation coil bounding the magnetic core. The current rotation degree can be detected by measuring the intensity and direction of the external magnetic field. The geomagnetic sensor 100 of FIG. 6 comprises an operation signal generating unit 110, a geomagnetism detecting module 120, a signal processing unit 130, a geomagnetism computing unit 140 and a memory 150.

The operation signal generating unit 110 generates and outputs an operation signal for operating the geomagnetism detecting module 120. As for the operation signal, a pulse waveform and an inverse pulse waveform can be used generally. Since the operation signal generating unit 110 comprises a pulse generator (not shown), a pulse limiter 111 and a pulse amplifier 112, a pulse generated in the pulse generator is switched optionally in the pulse limiter 111 based on a control signal, amplified and inverse amplified in the pulse amplifier 112, and then outputted. For the pulse limiter 111, an AND gate can be used. The pulse outputted from the pulse generator is outputted based on a control signal supplied to an end of the AND gate.

The pulse amplifier 112 provides two pulse signals having an inverse phase with respect to the pulse outputted from the pulse limiter 111 to the geomagnetism detecting module 120 by using a plurality of amplifiers and inverters.

In the meantime, the geomagnetism detecting module 120 receives an operation signal from the operation signal generating unit 110 and outputs a predetermined electric signal corresponding to geomagnetism. In FIG. 6, X and Y-axis fluxgates 121 and 123, which are two magnetic cores of a square ring shape, are set up in the direction of the X and Y axes longitudinally. Each magnetic core is bound with an operation coil and a detection coil. If an operation pulse is supplied to each operation coil, magnetism is induced in the X and Y-axis fluxgates 121 and 123 and, accordingly, an induced electromotive force is detected from the detection coil.

The signal processing unit 130 converts the induced electromotive force detected in the X and Y-axis fluxgates 121 and 123 into digital values through a predetermined process and outputs the digital values. To be specific, the signal processing unit 130 comprises a chopping circuit 131, a first amplifier 132, a filter 133, a second amplifier 134, and an A/D converter 135. The electric signal, which is outputted from the geomagnetism detecting module 120 and induced to the X and Y-axis fluxgates 121 and 123, goes through chopping by controlling a plurality of switches in the chopping circuit 131. The chopped electric signal is differentially amplified in the first amplifier 132, filtered in the filter 133 to obtain a signal in a predetermined range, and then finally amplified in the second amplifier 134. The amplified signal is converted into a digital voltage value in the A/D converter 135 and outputted.

The geomagnetism computing unit 140 performs normalization in which the actual output values outputted from the signal processing unit 130 are mapped to a predetermined range. For this, a manufacturer of geomagnetic sensor 100 places the geomagnetic sensor 100 in the horizontal level and measures the output values of the X and Y-axis fluxgates 121 and 123 while rotating it at least once. After measurement, the manufacturer selects the maximum value and the minimum value among the measured output values and records them in the memory 150.

The geomagnetism computing unit 140 inputs the maximum and minimum values recorded in the memory and the X and Y-axis output values detected in the signal processing unit 130 in the following equation 1 and performs normalization.

$$X_n = \frac{(X - X_{bias})}{X_{scale}},$$

$$X_{bias} = \frac{(X_{max} + X_{min})}{2},$$

$$X_{scale} = \frac{(X_{max} - X_{min})}{2}$$

$$Y_n = \frac{(Y - Y_{bias})}{Y_{scale}},$$

$$Y_{bias} = \frac{(Y_{max} + Y_{min})}{2},$$

$$Y_{scale} = \frac{(Y_{max} - Y_{min})}{2}$$

[Equation 1]

wherein X and Y denote output values of the X and Y-axis fluxgates 121 and 123; $X_n$ and $Y_n$ denote normalized values of X and Y; $X_{max}$ and $X_{min}$ denote the maximum and minimum values of X, respectively; and $Y_{max}$ and $Y_{min}$ denote the maximum and minimum values of Y, respectively.

The geomagnetism computing unit 140 computes $X_{bias}$, $X_{scale}$, $Y_{bias}$, and $Y_{scale}$ by inputting the $X_{max}$, $X_{min}$, $Y_{max}$ and $Y_{min}$ which are measured and stored in the memory 150 in advance into the equation 1 and then computes $X_n$ and $Y_n$ based on the $X_{bias}$, $X_{scale}$, $Y_{bias}$, and $Y_{scale}$.

Figure 7:
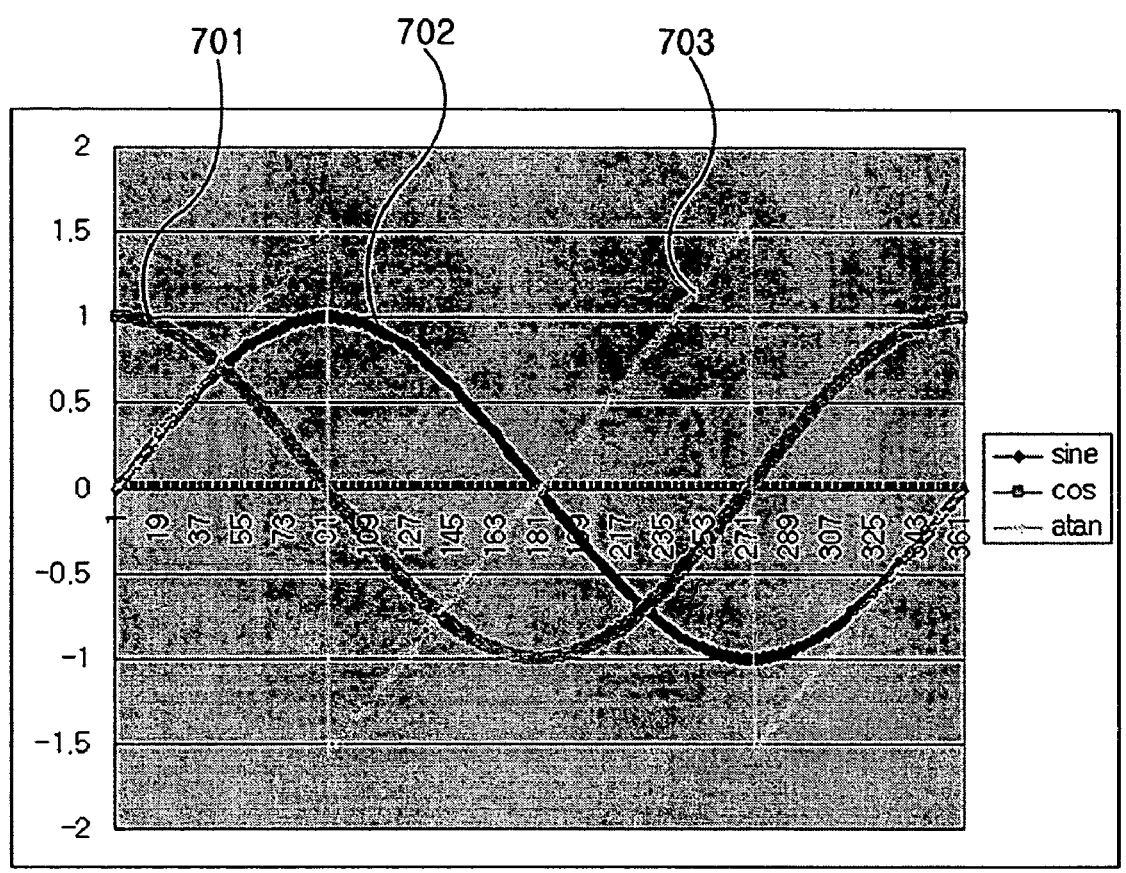
FIG. 7 is a graph showing output values of the fluxgate sensor of FIG. 6 at each axis.

FIG. 7 is a graph showing X and Y-axis output values which are normalized in the geomagnetism computing unit 140. Referring to FIG. 7, the X-axis output values are expressed as a cosine function graph 701 and the Y-axis output values are expressed as sine function graph 702.

The geomagnetism computing unit 140 computes a rotation angle based on the X and Y-axis output values. The rotation angle ψ is expressed as $\tan^{-1}$ (Y-axis output value/X-axis output value). FIG. 7 also presents a $\tan^{-1}$ function graph 703, which is expressed as Y-axis output value/X-axis output value.

Meanwhile, the $\tan^{-1}$ function value has a value in the range of 0° to 90° in the first quadrant and, in the second and third quadrants, it has a value in the range of −90° to +90°. In the fourth quadrant, it has a value in the range of −90° to 0°. As a result, in order to express all the range of 0° to 360°, the geomagnetism computing unit 140 computes the rotation angle based on an equation expressed as:

$1^{st}$ Quadrant: rotation angle=$\tan^{-1}(Y/X)$ $2^{nd}$ and $3^{rd}$ Quadrants: rotation angle=180°+$\tan^{-1}(Y/X)$ $4^{th}$ Quadrant: rotation angle=360°+$\tan^{-1}(Y/X)$ [Equation 2]

wherein X and Y denote output values of the X and Y axes, respectively.

The rotation angle computed in the geomagnetism computing unit 140 is inputted to the control unit 210. The control unit 210 extracts an image and a telephone number corresponding to the rotation angle from the main memory 230, as described before, and displays the image on the screen 241 through the display unit 240 and dials the telephone number by using the communication module 250.

In accordance with another embodiment of the present invention, the geomagnetic sensor 100 can measure the degree of rotation by using diverse sensors, such as a magnetic resistance sensor, a magnetic impedance sensor, and a hall sensor.

Figure 8:
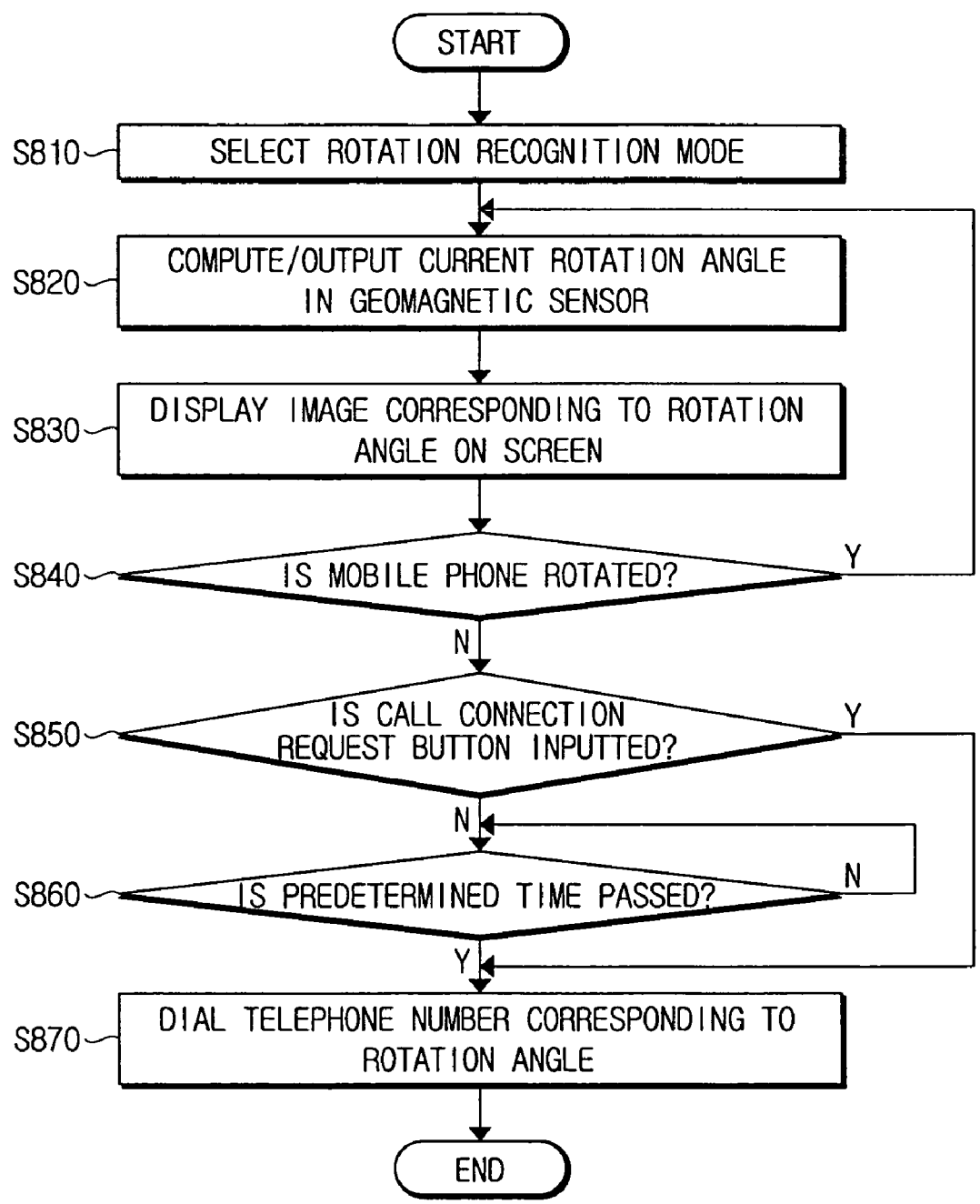
FIG. 8 is a flowchart describing a method for searching a telephone number by recognizing a rotation degree in a mobile communication device in accordance with an exemplary embodiment of the present invention.

FIG. 8 is a flowchart describing a method for searching a telephone number based on a rotation degree in the mobile communication device 200 in accordance with an embodiment of the present invention. In order to search a telephone number, at step S810, a 'rotation recognition mode' menu is selected by the user manipulating the key input unit 220.

If the 'rotation recognition mode' menu is selected (S820), the geomagnetic sensor 110 detects a predetermined output value from an X-axis fluxgate and a Y-axis fluxgate, and then the output values are normalized to compute a rotation angle. As described above, the geomagnetic sensor 100 performs normalization based on the equation 1 and computes the rotation angle in the range of 0° to 360° based on the equation 2.

The control unit 210 extracts an image corresponding to the computed rotation angle from the main memory 230 and displays it on the screen 241 (S830).

If the user further rotates the mobile communication device 200 and changes the rotation degree (S840), the changed rotation angle is computed and the image displayed on the screen 241 is changed.

If the user presses a 'send' button, which is a call connection request button, while a particular image is displayed on the screen 241 currently (S850), the control unit 210 controls the communication module 250 to dial a telephone number corresponding to the displayed image (S870).

If a predetermined time is passed while the user does not input the 'send' button, the mobile communication device can be operated to dial the telephone number automatically (S860).

Therefore, the user can make a call at the desired telephone number without manipulating keys for it.

As described above, the technology of the present invention makes it possible to search data stored in a mobile communication device easily by rotating it. In particular, if a telephone number stored in a mobile phone is searched, call connection can be made easily by rotating the mobile phone at predetermined angles and displaying an image corresponding to the desired telephone number.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A mobile communication device, comprising:
a body;
a geomagnetic sensor for detecting a rotation angle of the body based on an axis perpendicular to the earth surface;
a main memory for storing a predetermined range of rotation angles and images corresponding thereto;
a display unit for displaying a first image corresponding to the current rotation angle on a screen;
a control unit for, if the rotation angle detected in the geomagnetic sensor is changed, extracting a second image corresponding to the changed rotation angle from the main memory and controlling the display unit to display the second image, and, if the rotation angle detected in the geomagnetic sensor is not changed, controlling the display unit to maintain displaying the first image regardless of whether or not the mobile communication device moves to another position, and a communication module for dialing a telephone number corresponding to the displayed image automatically, if the displayed image is displayed on the screen for a predetermined time.

2. The mobile communication device as recited in claim 1, wherein the main memory stores a telephone number corresponding to each of the images.

3. The mobile communication device as recited in claim 2, further comprising:

a key input unit for receiving an external signal; and wherein the communication module dials the telephone number corresponding to the displayed image, if a predetermined image is displayed on the screen and a call connection request signal is inputted through the key input unit.

4. The mobile communication device as recited in claim 3, wherein the control unit controls the display unit to display all image data stored in the main memory on the edge of the screen in a direction corresponding to the rotation angle of each image, if a selection signal for selecting a rotation recognition mode is inputted through the key input unit.

5. The mobile communication device as recited in claim 4, wherein the control unit controls the display unit to display an image corresponding to the rotation angle detected in the geomagnetic sensor in the center of the screen, among all the images stored in the main memory.

6. The mobile communication device as recited in claim 1, wherein the geomagnetic sensor comprises:

a geomagnetism detecting module having an X-axis fluxgate and a Y-axis fluxgate for detecting electric signals corresponding to geomagnetism from the X and Y-axis fluxgates, individually, the X and Y-axis fluxgates being orthogonal to each other;

a signal processing unit for converting the electric signals detected from the X and Y-axis fluxgates into output values of X and Y axes and outputting the X and Y-axis output values; and a geomagnetism computing unit for normalizing the X and Y-axis output values into values in a predetermined range and computing the rotation angle based on the normalized X and Y-axis output values.

7. The mobile communication device as recited in claim 6, wherein the geomagnetism computing unit computes the rotation angle based on equations expressed as:

$1^{st}$ Quadrant: rotation angle=$\tan^{-1}(Y/X)$ $2^{nd}$ and $3^{rd}$ Quadrants: rotation angle=$180°+\tan^{-1}(Y/X)$ $4^{th}$ Quadrant: rotation angle=$360°+\tan^{-1}(Y/X)$ wherein the first to fourth quadrants are obtained by dividing the rotation range of the body on a 90° basis and X and Y denote the normalized X and Y-axis output values, respectively.

8. A mobile communication device, comprising:

a body;

a geomagnetic sensor for detecting a rotation angle of the body based on an axis perpendicular to the earth surface;

a main memory for storing a predetermined range of rotation angles and images corresponding thereto;

a display unit for displaying a first image corresponding to the current rotation angle on a screen;

a control unit for, if the rotation angle detected in the geomagnetic sensor is changed, extracting a second image corresponding to the changed rotation angle from the main memory and controlling the display unit to display the second image, and, if the rotation angle detected in the geomagnetic sensor is not changed, controlling the display unit to maintain displaying the first image regardless of whether or not the mobile communication device moves to another position, and a communication module for dialing a telephone number corresponding to the displayed image automatically, if the displayed image is displayed on the screen for a predetermined time.

9. The method as recited in claim 8, further comprising:

e) receiving a call connection request signal while a predetermined image is displayed on the screen; and f) dialing the telephone number corresponding to the displayed image.

10. The method as recited in claim 9, wherein, in the step c), all image data stored in the mobile communication device are displayed on the edge of the screen in a direction corresponding to the rotation angle corresponding to each image, and an image corresponding to the rotation angle of the mobile communication device is displayed in the center of the screen.

11. The method as recited in claim 8, wherein, in the step a), the rotation angle is detected by using a biaxial fluxgate sensor.

12. The method as recited in claim 11, wherein the step a) comprises:

a1) detecting electric signals corresponding to geomagnetism from the biaxial fluxgate sensor;

a2) converting the electric signals detected from the biaxial fluxgate sensor into output values of X and Y axes and outputting the X and Y-axis output values;

a3) normalizing the X and Y-axis output values into values of a predetermined range; and a4) computing the rotation angle based on the normalized X and Y-axis output values.

13. The method as recited in claim 12, wherein the rotation angle is computed based on equations expressed as:

$1^{st}$ Quadrant: rotation angle=$\tan^{-1}(Y/X)$ $2^{nd}$ and $3^{rd}$ Quadrants: rotation angle=$180°+\tan^{-1}(Y/X)$ $4^{th}$ Quadrant: rotation angle=$360°+\tan^{-1}(Y/X)$ wherein the first to fourth quadrants are obtained by dividing the rotation range of the body on a 90° basis and X and Y denote the normalized X and Y-axis output values, respectively.

* * * * *